(12) United States Patent
Hjul

(10) Patent No.: US 9,367,441 B2
(45) Date of Patent: Jun. 14, 2016

(54) METHOD FOR MANAGING PHYSICAL MEMORY OF A DATA STORAGE AND DATA STORAGE MANAGEMENT SYSTEM

(75) Inventor: Ivan Schultz Hjul, Varde (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 531 days.

(21) Appl. No.: 13/399,010

(22) Filed: Feb. 17, 2012

(65) Prior Publication Data

US 2012/0221805 A1     Aug. 30, 2012

(30) Foreign Application Priority Data

Feb. 25, 2011    (EP) ..................................... 11155942

(51) Int. Cl.
     *G06F 12/00*     (2006.01)
     *G06F 12/02*     (2006.01)
     *G06F 9/50*      (2006.01)

(52) U.S. Cl.
     CPC ............ *G06F 12/023* (2013.01); *G06F 9/5016* (2013.01)

(58) Field of Classification Search
     CPC .............................. G06F 12/023; G06F 9/5016
     USPC ........................................................ 711/154
     See application file for complete search history.

(56) References Cited

U.S. PATENT DOCUMENTS

| | | | |
|---|---|---|---|
| 6,427,195 B1 * | 7/2002 | McGowen et al. | 711/153 |
| 6,442,661 B1 * | 8/2002 | Dreszer | 711/170 |
| 7,039,774 B1 * | 5/2006 | Cruz-Rios et al. | 711/159 |
| 7,603,529 B1 * | 10/2009 | MacHardy et al. | 711/162 |
| 2002/0069338 A1 | 6/2002 | Ozdemir et al. | |
| 2002/0144073 A1 * | 10/2002 | Trainin et al. | 711/170 |
| 2003/0145185 A1 | 7/2003 | Lawton et al. | |
| 2006/0282644 A1 * | 12/2006 | Wong | 711/206 |
| 2009/0006502 A1 * | 1/2009 | Leung et al. | 707/205 |
| 2009/0216988 A1 * | 8/2009 | Palladino | 711/171 |
| 2010/0312984 A1 * | 12/2010 | Robin et al. | 711/171 |
| 2011/0125958 A1 * | 5/2011 | Maeda et al. | 711/103 |
| 2011/0246742 A1 * | 10/2011 | Kogen et al. | 711/170 |

FOREIGN PATENT DOCUMENTS

| | | | |
|---|---|---|---|
| CN | 101414281 A | 4/2009 | |
| CN | 101702138 A | 5/2010 | |
| CN | 101763308 A | 6/2010 | |

OTHER PUBLICATIONS

ONX Software Systems; QNX Neutrino RTOS; http://www.qnx.com/products/neutrino-rtos/neutrino-rtos.html, Mar. 23, 2010.

* cited by examiner

*Primary Examiner* — Charles Rones
*Assistant Examiner* — Nanci Wong

(57) ABSTRACT

A method is provided managing physical memory of a data storage, for example, a heap. The method includes requesting a memory portion having a memory portion size and identifying a pool. The pool is provided for storing at least one access information indicative of an address of a memory block of the data storage. The memory block has a memory block size equal to or larger than the memory portion size. The method further includes determining whether the access information is stored in the pool. If the access information is stored in the pool, address data of the memory block is returned, wherein the address data are based on the access information, and access information is removed from the pool. If the access information is not stored in the pool, the access information is created, and address data of the memory block is returned.

16 Claims, 1 Drawing Sheet

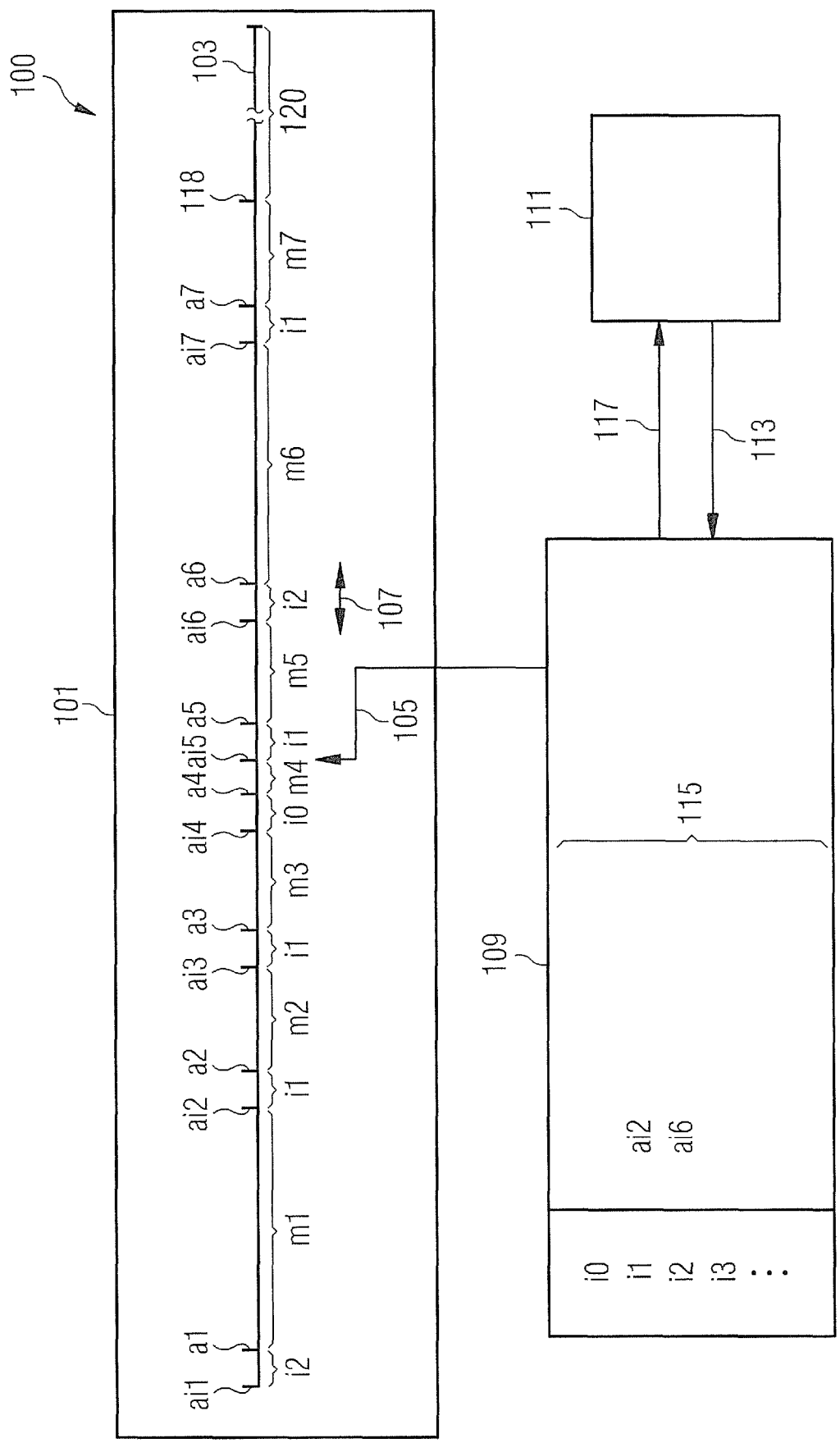

METHOD FOR MANAGING PHYSICAL MEMORY OF A DATA STORAGE AND DATA STORAGE MANAGEMENT SYSTEM

CROSS REFERENCE TO RELATED APPLICATIONS

According to a heap management system, part of an operating system which is offered by the company QNX Software Systems the physical memory of the heap is split in 4 kbyte sized memory portions. The physical memory is mapped to a virtual memory, wherein every operation, process or application may allocate or access the virtual memory. The virtual memory may simulate a continuous section of a memory which however may be mapped to a large number of 4 kbyte memory (separated) portions in the physical memory, which may be distributed across the physical memory, such that they may be interspersed with not allocated memory portions. For every access to the memory a mapping from the virtual memory to the physical memory needs to be performed which slows the operation down.

FIELD OF INVENTION

The present invention relates to a method for managing physical memory of a data storage and to a data storage management system. In particular, the present invention relates to a method for managing physical memory of a data storage and to a data storage management system, wherein a reliability and/or availability and/or determinism and/or a speed of allocation and/or access of the physical memory is improved compared to conventional methods or systems.

ART BACKGROUND

In particular for real-time requirements for which it is required that the result is correct and the result is obtained within a predetermined time, memory management may be of a particular concern.

In particular, the real-time application may comprise measuring a physical quantity, such as a wind speed, a temperature, a vibration, an amount of electric power, an electric voltage, an electric current or the like. In particular, the real-time application may run to control and/or monitor a power plant, such as a power generation system, in particular a wind turbine system. In particular, the wind turbine may be required to be controlled depending on one or more measuring data measuring physical quantities, such as the wind speed, the temperature, the amount of electric energy produced, a frequency of a utility grid connected to the wind turbine and the like.

Herein, it may be required that access to and/or allocation of a requested memory portion is gained or granted within a predetermined time, to ensure that the result is obtained within the predetermined time of the real-time system or application. In particular, the application may access or allocate a portion of the heap, which may be a memory area reserved for dynamic memory allocation and memory de-allocation.

According to a heap management system, part of an operating system which is offered by the company QNX Software Systems (http://www.qnx.com/download/feature.html?programid=19524) the physical memory of the heap is split in 4 kbyte sized memory portions. The physical memory is mapped to a virtual memory, wherein every operation, process or application may allocate or access the virtual memory. The virtual memory may simulate a continuous section of a memory which however may be mapped to a large number of 4 kbyte memory (separated) portions in the physical memory, which may be distributed across the physical memory, such that they may be interspersed with not allocated memory portions. For every access to the memory a mapping from the virtual memory to the physical memory needs to be performed which slows the operation down.

There may be a need for a method for managing physical memory of a data storage, in particular a heap, and for a data storage management system, wherein allocating and/or de-allocating and/or accessing a memory portion may be improved, in particular more efficient compared to conventionally known methods or systems. In particular, there may be a need for a method for managing physical memory of a data storage, in particular a heap, and for a data storage management system, in particular comprising a heap, wherein allocation and/or access of a memory portion may be performed in a predictable time span.

SUMMARY OF INVENTION

This need may be met by the subject matter according to the independent claims. Advantageous embodiments of the present invention are described by the dependent claims.

According to an embodiment, a method (which may for example be implemented in software, such as using a high level computer language, such as C++, JAVA, C, or which may be implemented by a low level computer language, such as assembler, or wherein the method is implemented in hardware, such as for example by providing an application specific integrated circuit (ASIC)) for managing (in particular for allocating, accessing, de-allocating and/or assigning) physical memory (in particular comprising a plurality of memory cells which may be addressed or referred to by associated unambiguous addresses) of a data storage (for example a portion of a RAM, in particular a heap, or a harddisk, or a flash memory, or any other device which is adapted to store data in an electronic form), in particular a heap (in particular representing an electronic memory area reserved for dynamic memory allocation and/or de-allocation), wherein the method comprises requesting (in particular by a requester, such as a computer process, a computer application, a thread running on the computer, or the like) a memory portion (in particular for using this memory portion for writing data into the memory portion by the application or by the process, such as for example when a variable, a data object or any other data structure is instantiated within the application or within the process) having a memory portion size (which may be represented by a particular number of bytes that are requested by the requester for storing variables, data structures or data objects being used in the application or the process running on the computer or processor).

The method for managing physical memory of the data storage further comprises identifying (in particular comprising determining, calculating or/and deriving) a pool (in particular a data pool, in particular a data container being provided for storing electronic data, in particular provided for storing addresses of the data storage, wherein each address points to a particular memory element or memory cell of the data storage), wherein the pool is provided for storing a number of instances of access information (in particular addresses of the physical memory of the data storage, wherein the access information is indicative of an address to an index portion of the data storage, wherein the length of the index portion may for example be 1 or more bytes, e.g. 4 bytes or 8 bytes), wherein the access information is indicative of an address (in the physical memory of the data storage) of a memory block of the data storage (the address of the memory block in particular being a start address of the memory block, wherein at this start address the memory block starts, wherein the memory block may span a plurality of addresses starting from the start address and extending up to an end address, wherein the extent of the memory block (the difference between the end address and the start address) may correspond to the memory block size, such as a memory block size of a particular number of bytes), wherein the memory block has a memory block size equal to or larger than the memory portion size (such that the requester, requesting memory having the memory portion size is able to use the memory block to hold or store data the application needs to store). In particular, the memory block may be allocated to the requester and may be reserved by the data storage management system performing the method for managing physical memory of the data storage such that no other application or no other process may access the reserved memory block. Thereby, data integrity may be ensured.

In particular, the access information may be or comprise the address (in the physical memory of the data storage) of the extended memory block of the data storage or the address of the memory block of the data storage. In any case the address of the memory block of the data storage may be derivable from the access information.

Further, the method for managing physical memory of the data storage comprises determining whether access information is stored in a pool. Further, the method comprises, if the access information is stored in a pool (which may indicate that this particular memory block has previously been allocated by the same or by another process or application but which has been released again, since the memory block was not used any more by this process or by this application), returning address data of the memory block (in particular returning the address data to the requester requesting the memory portion, in particular returning the address data to the process or the application requesting the memory portion), wherein the address data are based on the access information (such that using the access information the address data are derivable or obtainable, for example the address data may represent an address of the physical memory of the data storage, which address is spaced apart from the access information (in particular also an address of the physical memory of the data storage) by a predetermined, fixed value, such as 1 byte, 2 bytes or more bytes) and removing the access information from the pool (in particular the access information may be deleted from the pool), thereby indicating that this memory block is not available any more for any other application or for any other process or for any other requester.

Further, the method comprises, if the access information is not stored in the pool (indicating that the memory block has not yet been allocated or accessed by any application or any process or any request before), creating the access information (which may comprise searching within the physical memory of the data storage for a portion which is still available, i.e. which has not been accessed by any requester), and returning address data of the memory block (in particular to the requester, such as an application or a process requesting the memory portion), wherein the address data are based on the access information.

In particular, in any case, upon requesting the memory portion, address data of an available memory block are returned to the requester, in particular an application or a process running on a computer, wherein the available memory block may be identified by the address data, wherein in particular the address data may be the address, where the memory block starts within the physical memory of the data storage. In other embodiments, the address data may for example be any address within the memory block but being spaced apart from the start of the memory block or spaced apart from the end of the memory block by a predetermined amount of addresses.

In particular, the address data may represent the start address of the memory block, thus simplifying the procedure for accessing the memory block by the requester. In particular, any memory block which has been allocated (in particular by returning the address data of the memory block to the requester) will be controlled by the method for managing physical memory, such that this memory block will only be assigned to any later requester in an not fragmented manner, such that the entire memory block may be allocated later on by any later requester. After the memory block is allocated for the first time, the method for managing physical memory of the data storage may ensure that the memory block will not be allocated in fragmented portions of the memory block. In particular, performing the method for managing physical memory of the data storage may avoid fragmentation of the physical memory of the data storage. Further, a time span between the requesting the memory portion and the returning the address data may be predictable and may in particular be smaller than or equal to a predetermined allocation time span. Thereby, in particular, real-time application or processes may be supported by performing the method for managing physical memory of the data storage.

According to an embodiment, the memory block comprises a continuous physical memory section of the data storage (such that the memory block may be formed by a number of adjacent memory segments or memory elements), wherein the physical memory section has the memory block size, wherein in particular the memory block is formed by physically consecutive memory cells (in particular by memory cells which are being addressed by consecutive addresses). Thereby accessing portions of the memory block or the entire memory block may be accelerated and/or simplified. Thereby, not only the memory allocation time span but also the memory access time span may in particular be reduced.

According to an embodiment, the creating the access information is based on a start address (a physical start address) of an available portion (which portion has not been allocated before, which may therefore represent a free memory portion) of the data storage and wherein the creating the access information further comprises changing the start address of the available portion based on the memory block size.

In particular, the start address of an available portion of the data storage may be considered as a pointer pointing to a particular address of the data storage, wherein for addresses larger (or smaller) than the start address the memory may be free, i.e. available for the requester. Whenever the address data of the memory block are returned to the requester, the pointer pointing to the start address from which on there is available memory will be shifted, since the available portion of the data storage has been diminished due to the allocation of the memory block to the requester. In particular, the start address of the available portion of the data storage may be stored in a data structure which may be accessed. In particular, the start address may be read out, whenever a further request for a memory portion is received and wherein there is no access information in the corresponding pool which may be returned to the requester. A start address for the free area may be maintained such that it may not be necessary to search for a memory block large enough. If there is not enough free memory at the start address, then there may not be enough free memory to fulfill the request. If there is enough memory to fulfill the request then the start address may be changed according to the size necessary to fulfill the request such that the free area is shortened. The number of and/or the combination of earlier requests to get and/or release memory may therefore not affect the time it takes to determine if and where in the heap there is enough memory to fulfill the request. In particular, this can be determined fast and in constant time. Thereby this may accelerate returning the address data of the memory block to the requester.

According to an embodiment, the creating the access information further comprises writing (in particular electronically modifying one or more memory cells) a pool index (which may enable to identify the pool) relating to the pool into the physical memory of the data storage at an index portion (in particular spanning one or more addresses) of the data storage, wherein an address of the index portion is based on the access information (wherein in particular a start address of the index portion may be the access information), wherein in particular the changing the start address of the available portion of the data storage is further based on a size of the index portion.

In particular, the memory block size may be entirely available for the requester, while the index portion may represent a management overhead for performing the method for managing physical memory of the data storage. In particular, the index portion may be a small portion compared to the memory block size, in particular the index portion may require 1 byte, while the memory block size may be any size larger than zero. In particular, a sum of the index portion and the memory block size may, according to an embodiment, correspond to a number of bytes, wherein the number is a power of two. In particular, one or more further pools may be adapted to store addresses (access information) which relate to different memory block sizes, as will be explained in detail further below.

According to an embodiment, the method for managing physical memory of the data storage further comprises releasing (in particular releasing by the requester or the application or the process), in particular by a requester having requested the memory portion, the memory portion (thereby in particular comprising receiving an information relating to the address of the released memory portion); and storing the access information in the pool. Thereby, the access information may be derived from the memory portion, in particular from the address of the memory portion. In particular, the releasing the memory portion may represent that the requester does not require the memory portion any more, since for example variables or data objects accessing the memory portion have been deleted, in particular destructed, within the running application or the running process.

According to an embodiment, the method for managing physical memory of the data storage further comprises determining the access information based on the address of the memory block (in particular, if the address of the memory block represents the start address of the memory block, the access information may be an address before or after the start address of the memory block, in particular the address immediately before the address of the memory block), wherein the storing the access information in the pool is based on the determined access information. In particular, a particular amount may be subtracted from the address of the memory block, to obtain the access information (in particular an address). Thereby, the method may be simplified.

According to an embodiment, the method further comprises, upon releasing the memory portion, maintaining (in particular keeping, thus not deleting) the pool index relating to the pool in the physical memory of the data storage at the index portion of the data storage (such that in particular the pool index is kept in the physical memory of the data storage, although the requester has released the memory portion).

This may be in profound contrast to conventional methods for heap management, wherein upon releasing the memory portion any information (which is stored in a data container apart from the memory reserved to be assigned to a requester) indicating that this memory portion or the corresponding memory block has been allocated before is erased from the physical memory of the data storage, such that in the conventional system there is no information, whether a memory portion has been assigned to and used by a requester before.

According to an embodiment, a pattern of differently sized memory portions being subsequently requested by one or more requesters may lead to a pattern of plural pool indices stored at addresses that are spaced apart corresponding to the plural memory blocks which may have different memory block sizes depending on the size of the memory portions being subsequently requested. This pattern of plural pool indices written at plural instances of access information may be maintained during performing the method, even if one or more memory portions are being released by the one or more requesters.

According to an embodiment of the method for managing physical memory of the data storage, the index portion, in the data storage, is physically located adjacent (in particular immediately adjacent) to the memory block, in particular in a byte before or in a byte after the memory block. Thereby, the index portion may be found based on the address of the memory block in a simple manner. Further, also the memory block, in particular the address of the memory block, further in particular the start address of the memory block, may be found based on the address of the index portion, in particular based on the access information, in a simple manner. Thereby, a performance, in particular a speed of the method, may be increased.

According to an embodiment of the method for managing physical memory of the data storage, the identifying the pool comprises determining the pool index based on the access information. In particular, when the access information represents an address in the data storage, the pool index may be determined by accessing and reading the data stored at the access information (and spanning a number of addresses corresponding to the index portion).

According to an embodiment of the method for managing physical memory of the data storage, another access information (in particular also being an address within the physical memory of the data storage) is stored in the pool, wherein the other access information is indicative of another address of another physical memory block of the data storage, wherein the other memory block has the same memory block size as the memory block.

According to an embodiment of the method for managing physical memory of the data storage, the pool is adapted to store plural instances of access information (such as in particular addresses) including the access information and the other access information, wherein the pool is adapted such that the access information and the other access information are accessible in a time span which is independent of the number of the plural instances of access information stored in the pool. Thereby, in particular, the pool may store the plural instances of access information in an array-like data structure, in a queue, in another suitable data container or in any other data structure that enables storing a number of elements and accessing the elements in constant time independent of the number of elements. Thereby, the performance, in particular the speed, of the managing method may be increased.

According to an embodiment of the method for managing physical memory of the data storage, the method further comprises support for handling a request of a further memory portion having a further memory portion size; identifying a further pool, wherein the further pool is provided for storing at least one further access information indicative of a further address of a further memory block of the data storage, the further memory block having a further memory block size which is equal to or larger than the further memory portion size and different from the memory block size; determining whether the further access information is stored in the further pool; if the further access information is stored in the further pool, returning further address data of the further memory block, wherein the further address data are based on the further access information and removing the further access information from the further pool; if the further access information is not stored in the further pool, creating the further access information, and returning further address data of the further memory block, wherein the further address data are based on the further access information.

According to an embodiment of the managing method providing the pool and the further pool, another further access information may be stored in the further pool, wherein the other further access information is indicative of another further address of another further memory block of the data storage, wherein the other further memory block has the further memory block size. Thus, in particular, in a particular pool access information, in particular several instances of access information, may be stored, wherein each instance of the access information relates of a memory block having the same memory block size.

According to an embodiment of the managing method, the method further comprises defining a data container, in particular in the data storage or e.g. in a further data storage separate form the data storage, for storing plural pools, in particular a predetermined number of pools, wherein the pool and the further pool are stored in the data container, wherein the data container is adapted such that the pool and the further pool (and/or elements comprised in the pool and the further pool) may be accessed within a time span which is constant independent of the number of the plural pools stored in the container. In particular, the data container may be an array-like data structure or any other data container which allows access to any of its elements in a constant time independent of the number of elements stored within the data container. The pools can be of any type that can remove at least one of its element in constant time, and may be able to add an element in constant time.

It should be understood that any features (individually or in any combination) disclosed with respect to explanations or descriptions of one or more embodiments of a method for managing physical memory of a data storage may also be applied (individually or in any combination), used for, employed or adapted for a data storage management system according to embodiments of the present invention and vice versa.

According to an embodiment of the present invention, a data storage management system is provided, wherein the system comprises a data storage for storing data; and a controller for controlling an access to the data storage, wherein the controller is adapted such that the controller performs the following method steps: receiving a request, the request requesting a memory portion having a memory portion size; identifying a pool, wherein the pool is provided for storing at least one access information indicative of an address of a memory block of the data storage, the memory block having the smallest possible fixed memory block size equal to or larger than the memory portion size; determining whether the access information is stored in the pool; if the access information is stored in the pool, returning address data of the memory block, wherein the address data are based on the access information and removing the access information from the pool; if the access information is not stored in the pool, creating the access information, and returning address data of the memory block, wherein the address data are based on the access information.

In particular, the data storage may be at least a portion of a RAM, in particular a heap, a harddisk, a hard drive, a flash storage, a magneto-optical data storage or any other data storage for storing data, in particular electric and/or electronic data. In particular, the controller may be configured as an application specific integrated circuit, as (a part of) an operating system for operating a processor, in particular operating a computer. Further in particular, the controller may be an additional component or external device interfacing to the data storage and providing an access layer for accessing the data storage. Further in particular, the controller comprises a general purpose processor and a software element which may be executed by the processor.

According to an embodiment of the present invention, a power production system, in particular a wind turbine system, is provided which comprises the data storage management system, wherein the controller in particular controls access to the data storage, wherein access to the data storage is requested by an application for controlling and/or monitoring the wind turbine system, in particular for measuring a physical quantity, such as a wind speed, a temperature, a vibration and/or for controlling at least one component of the energy production system, such as a rotor blade, in particular a rotor blade pitch angle, an amount of energy produced or released by a converter of the wind turbine system or the like.

According to an embodiment of the present invention, the method for managing physical memory of a data structure is performed in a real-time application, wherein in particular the real-time application requires that a result is correct and that the result is obtained within a predetermined time span.

According to an embodiment of the present invention, a program element and/or an electronically readable storage medium are provided, in particular harbouring the program element, wherein the program element, when executed by a processor, such as a computer, is adapted to carry out or control an embodiment of a method for managing physical memory of a data storage, as described above.

According to embodiments of this invention, pools of the needed sizes are build by the needs of the system it selves. This may be at a cost of a higher memory usage and introduction of a similar but smaller issue. In a situation where the system needs more memory blocks of a given size than it has used since start-up and the unused heap has become too small to allocate a block of the proper size, then the total sum of unused memory blocks in pools and heap not in pools together may be enough for the request without being possible to return as a contiguous memory block. This could only happen, if the total amount of heap is not enough to create the number of different memory blocks that the system has been needed during its execution. If this happens, then it could degrade availability. For systems that has similar memory usage from time to time and where availability is degraded because of denied request for heap, then more memory would increase availability. If the buffers require no more than the provided heap, then the system would be able to continue use all it's memory block sizes and the number of each size equal to the highest number of those sizes that the system at any time earlier has used. Running the system for long time does not change that fact.

One of the advantages of embodiments of this invention is that the number of large memory blocks (needed by the system) can not be reduced as time goes by, it can only increase. The number of allocated blocks of any given size is at any time equal to the highest number of blocks (of that size) that the system has been used since the system started. Compared to the common heap management strategies this solution can only grow in the number of allocated blocks of any given size.

The fact that the number of large memory blocks of different sizes can not decrease over time, makes testing for needed amount of heap easier and more reliable. If a system has a similar memory usage from time to time, then installing more memory will reduce downtime caused by insufficient heap.

According to an embodiment memory is allocated from one end of the heap and memory is only allocated in continuation hereof (similar to next fit where memory is not released), and any memory is never returned to the free heap that has not yet been made into memory blocks. A memory block that is returned to the heap manager is stored in a pool instead. This ensures that external fragmentation of the heap (not made into memory blocks) is avoided. Memory may always be allocated in one of more possible fixed sizes. A pool may be created for each possible fixed block size.

Each pool may only be used for addresses of one specific block size, and no two pools have addresses to blocks of the same size. When a memory block address is returned to the heap manager, then it may be stored in the pool for that memory block size.

Embodiments of the invention may provide a heap manager that is a piece of software (and/or hardware) that is used to manage heap.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Embodiments of the present invention are now described with reference to the accompanying FIGURE.

The FIGURE schematically illustrates a data storage management system according to an embodiment of the present invention, wherein the data storage management system is adapted to perform a method for managing physical memory of the data storage according to an embodiment of the present invention.

DETAILED DESCRIPTION

The illustration in the drawings is in schematic form. It is noted that in different figures, similar or identical elements are provided with the same reference signs or with reference signs, which are different from the corresponding reference signs only within the first digit.

The data storage management system 100 comprises a data storage 101 for storing data, wherein the data storage may in particular be a heap. The data storage 101 comprises plural memory cells which may be accessed using unambiguous memory cell addresses, wherein the memory cells are arranged in a consecutive manner and the plurality of memory cells is depicted as a line 103.

The data storage 101 comprises an accessing component 105 which may access any of the memory cells by referring to each of the memory cells using an address in the data storage 101. The addresses are numbers arranged in an increasing order, for accessing particular memory cells by the accessing device 105. Thereby, the accessing device 105 may move along the plural memory cells 103 as indicated by the double arrow 107. The accessing device 105 may be a purely electronic device having no mechanical components. For example, in particular when the data storage comprises a heap, the accessing device 105 may be a control circuit adapted for accessing different memory cells of a memory chip. In other embodiment, in particular when the data storage comprises a hard-disk or hard-drive or any other storage comprising mechanical elements, the accessing device 105 may comprise mechanical and/or electronic components.

The data storage management system 100 further comprises a controller 109 for controlling an access and/or allocation of portions of the data storage 101. In particular, in the illustrated example, a process or an application 111 may request a memory portion (having a particular memory portion size) from the controller 109. Thereby, the application 111 may transmit a request 113 for this memory portion to the controller 109.

The controller 109 will be adapted to maintain a data container of plural pools, wherein each of the pools is provided for storing access information relating to a memory block having a particular memory block size. In particular, the controller 109 may keep a data container 115, wherein an array index i0, i1, i2, i3, . . . identifies a pool, wherein in each pool has a number of instances of access information, such as ai1, ai2, ai3, ai4, ai5, ai6, and ai7 may be stored.

In particular, the pool identified by the index i0 stores instances of access information ai4, wherein this access information ai4 relates to memory block m4 having a memory block size of 2 bytes. The index i1 identifies a pool which stores or may store instances of access information ai2, ai3, ai5, and ai7, wherein these instances of access information relate to memory blocks m2, m3, m5 and m7, respectively, which all have the same memory block size of 4 bytes. Further, the index i2 identifies a pool in which instances of access information ai1, ai6 may be stored, wherein these access information instances relate to memory blocks m1, and m6, respectively, which both have a memory block size of 8 bytes.

Further, the controller 109 may comprise in the data container 115 further pools having indices i3, i4, . . . identifying the further pools relating to memory blocks within the data storage 101 which have even larger memory block sizes.

After starting up the data storage management system 100, the application 111 may first request a memory portion having a memory portion size of for example 6 bytes. Upon receipt of the request 113 from the application 111 the controller 109 will identify a pool which is provided for storing access information aI1 indicative of an address a1 of a memory block m1 of the data storage 101, wherein the memory block m1 has a memory block size of 7 bytes which is larger than the requested memory portion size having a size of 6 bytes.

Upon receiving the request 113 for a memory portion having a memory portion size of 6 bytes the controller 109 will allocate memory cells 103 in the data storage 101 from one of the ends of the memory cells 103 in the data storage 101, since at one of the ends the start pointer 118 (described in detail below) will be positioned. Alternatively, allocation could be from the end and going backwards instead.

The controller 109 will then write, into the data storage 101, starting at the address ai1 at an index portion i2 (the index i2 of the pool which is provided for storing access information relating to memory blocks having a size of 7 bytes). The start address a1 of the memory block m1 may be obtained from the access information ai1 by adding the length of the index portion i2 to the address ai1. The thus determined start address a1 of the memory block m1 is then returned via the response 117 to the requesting application 111. Further, the index i2 is written into the index portion. In particular, the access information ai1 is not added to the pool identified by the index i2.

Further, in particular later on, the application 111 may request a memory portion having a memory portion size of 2 bytes. Upon receiving the request from the application 111 the controller 109 will identify the pool labelled or indexed by the index i1, wherein this pool is provided for storing instances of access information relating to memory blocks having a memory block size of 3 bytes. Further, the index i1 is written in the index portion starting at the access information ai2. Further, the address a2 is returned to the application 101 using the response 117.

Additionally, the controller 109 may receive further requests for memory portions from the application 111 or from several other applications or processes running on a computer. In particular, when a new request for a memory portion is received by the controller 109 the controller 109 first look in the appropriate pool identified by one of the indices i0, i1, i2, . . . for an access information which is related to a memory block having a sufficient memory block size to satisfy the request for memory.

If the appropriate pool in the data container 115 has no such access information, the controller 109 determines if the data storage starting at a start address 118 of available memory indicating a start of an available section of the data storage 101 is large enough. In particular, the start address 118 of available memory is dynamically adapted (shifted in the direction of the unused end, in this case to the right in the FIGURE), whenever the controller 109 returns an address or address data a1, a2, a3, a4, a5, a6, a7 to the application 111. Thus, determining the location for an available or free memory portion may be performed in a predictable time span, in particular it may be done in constant time.

While executing the application 111 the application may from time to time release a memory portions which have previously been used by the application 111. For example, the application may release a memory portion stored in the memory block m2. Thereby, the application 101 may transmit the address data a2 to the controller 109. Based on the address data a2, the controller 109 may determine the access information ai2 and the controller 109 may look into the data storage at the address ai2 to retrieve the index i1. Thereupon, the access information ai2 will be stored in the pool identified by the index i1.

Further, the application 111 may release a memory portion which is stored in the memory block m6 which starts at the address a6. Thus, the application 111 may transmit the address a6 to the controller 109. From the address a6 the controller 109 may calculate the access information ai6, for example by subtracting 1 byte from the address a6, in particular by subtracting from the address a6 the width or size of the index portion i2. Then, the controller 109 will access the data storage 101 at the address ai6 and will read the index i2 being stored at this address. Thereupon, the access information or address ai6 will be stored in the pool identified by the index i2, as is illustrated in the FIGURE.

Later on, the application 111 or any other application or process may send a request 113 to the controller 109 requesting a memory portion having a size of 4 to 7 bytes. The controller 109 will first identify the pool which is designed for storing access information relating to memory blocks having the least size that is sufficient and will identify the pool indexed by the index i2. The controller 109 will then look, whether the pool indexed by index i2 contains an access information. The controller 109 will find the access information ai6. From the access information or address ai6 the controller 109 will determine or calculate the address a6 being the start address of the memory block m6 having the memory block size 7. Thus, the memory block m6 is sufficiently large to satisfy the request 113 requesting a memory portion having a size of 4 to 7 bytes. Thereupon, the controller 109 will return the address a6 to the application 111 and will also remove the access information ai6 from the pool identified by the index i2.

Depending on requesting a memory portion and/or releasing a memory portion the data container 115 and in particular the different pools indexed by the indices i0, i1, i2, i3, . . . will contain dynamically changing access information instances, wherein only a particular situation is depicted in the FIGURE.

The pools may be stored in an array like structure 115 (or other structure with constant time access). The possible memory block sizes (and their matching pools) may be ordered by an algorithm so that the array index i1, i2, i3, . . . to a pool of a certain memory block size may be calculated in constant time. This invention may not require any specific algorithm to be used; it only requires that the algorithm can be executed in constant time. The implementation could even allow for configuration of algorithm. An array index to the matching pool may be stored in the first byte(s) of each extended memory block (could have been the last byte(s) instead). An extended memory block may be the memory block extended (at the start or the end) with the index portion. For the requester to be able to store data in the memory block, the size has to be at least index-size+1, but a larger smallest memory block size could be chosen, to reduce overhead. Other considerations that could be taken into account (but not limited to):

Higher minimum size may reduce overhead, and increase waste (on average for used memory blocks)

Higher minimum size may also reduce the number of pools and therefore may make the pool with the smallest size more flexible as more different sizes fall within this pool. Minimum size could also be configurable.

When a memory block address is returned to the heap manager 109, then the size of the index portion i1, i2, i3, i4, i5, i6, i7 is subtracted to get the address (or access information) ai1, ai2, ai3, ai4, ai5, ai6, ai7 of the index to the entrance of the array that has the matching pool. The address of the index represents the address of the extended memory block. The extended memory block address, i.e. the access information ai1, ai2, ai3, ai4, ai5, ai6, ai7, is then stored in the matching pool. The pool is stored or maintained in a container 115 that is able to access its elements in constant time. The pool is a container that is able to add an element in constant time and remove at least one of its elements in constant time.

Because the index i1, i2, i3, . . . of the array entrance is stored in the start of each memory block, no searching is necessary, and choosing the right pool can be done in constant time.

When a request 113 for memory is received, the pool for the smallest block size that is big enough for the request+the size of the index is checked for emptiness. If the pool is empty, then a new memory block of that size is created from available heap 120. In the first byte(s) (according to the size of the chosen index) the array index is written, and the address a1, a2, a3, a4, a5, a6, a7 of the first byte after the index is returned to the requester.

If the pool was not empty, then any of the memory addresses ai1, ai2, ai3, ai4, ai5, ai6, ai7 is removed from the corresponding pool and the address a1, a2, a3, a4, a5, a6, a7 of the first byte after the index in the block is returned to the requester.

An example of the invention uses an algorithm where the first pool contains extended memory blocks of size 2 and each subsequent pool is for extended memory blocks of twice the size of the previous pool. But other algorithm could be used as well. It is important that the algorithm can calculate the index to the appropriate pool based on the size of the memory request in constant time. Other considerations that could be taken into account (but not limited to):

Algorithm with fewer different sizes results in

Increased waste of blocks in use.

Higher chance for an unused block to be usable again.

Fewer unused memory blocks on average.

The intended block size of a pool can be calculated based on its index in the array (where the first index is zero) as:

$$f(x) = 2^{(x+1)}$$

Where x is the index into the array, and f(x) returns the memory block size that the pool is used for.

The following example use one byte for the index portion (thus for storing the index i0, i1, i2, . . . ) and one byte for storage (two bytes in total) for the smallest memory block in the pool (with index 0). Index 1 is for extended memory blocks of size 4, and so on:

| Array index | 0 | 1 | 2 | 3 | 4 | 5 | 6 | 7 | 8 | ... |
|---|---|---|---|---|---|---|---|---|---|---|
| exended Mem. block size | 2 | 4 | 8 | 16 | 32 | 64 | 128 | 256 | 512 | ... |
| Overhead for index | 1 | 1 | 1 | 1 | 1 | 1 | 1 | 1 | 1 | ... |
| Available storage | 1 | 3 | 7 | 15 | 31 | 63 | 127 | 255 | 511 | ... |

An algorithm to find the correct index to the array based on a requested memory size for this example could be:

$$f(x) = \text{round\_floor}(\log 2(x))$$

Where x is the number of bytes (the memory portion size) that the requester needs and f(x) returns the index to the array that has a pool for the smallest block size that is big enough. round_floor( ) truncates any digits after the decimal point. Examples:

| x | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| f(x) | 0 | 1 | 1 | 2 | 2 | 2 | 2 | 3 | 3 | 3 | 3 | 3 | 3 | 3 | 3 | 4 | 4 | 4 | 4 | 4 | 4 | 4 | 4 | 4 |

A request for 1 byte should look for a free memory block address in the pool that is in the array entrance 0. [2 . . . 3] byte request in entrance 1. [4 . . . 7] byte request in entrance 2 and so on.

Examples of f(x) with large numbers of x:

| x | 1000 | 1E+06 | 1E+09 | 1E+12 | 1E+15 | 1E+18 | 1E+21 | 1E+24 | 1E+27 | ... |
|---|---|---|---|---|---|---|---|---|---|---|
| f(x) | 9 | 19 | 29 | 39 | 49 | 59 | 69 | 79 | 89 | ... |

Entrance 255 would contain addresses to memory blocks of 1,15792E+77 bytes which should be sufficient for the near future. When it is not sufficient or if an algorithm with a less steep curve is used, then an index of 2 bytes with an array of up to 65536 entrances could be used. If still more is needed 4 bytes with index up to 4294967296 entrances could be used (and so on).

At initializing of the heap manager 109 the array 115 of pools could be limited to only contain sizes that are possible with the given amount of heap.

As no extended memory blocks are created when the heap manager 109 starts, only extended memory blocks of the size that the system use is created. When memory blocks are released, they would be ready in a pool for the next use and not be made available for other allocation sizes. Often the system (such as application or process 111) may use the same block sizes again. Memory blocks that are x bytes larger than the previous pools memory block size, are able fulfil x different memory request sizes, it is therefore not necessary that the system require the exact same block sizes again for the free memory blocks to usable again.

Any pool will at maximum contain the number of memory blocks that the system at any time simultaneous has been used.

Waste of memory blocks in use will on average be below 25% for the example algorithm, but the solution is not limited to the example algorithm. Waste/internal fragmentation could easily be reduced to below 1% on average using a less steep curve for increase in block sizes, but at the cost of narrowing the average different request sizes, memory blocks can fulfil. It is therefore a sub optimization that could be adjusted for the purpose of the specific systems need.

Advantages of embodiment of the invention that arise from the technical features may be:

Availability is not lowered caused by external fragmentation of heap. This issue has been handled in a way where pools of the needed sizes are build by the needs of the system it selves and avoid the size and number of large memory blocks to be lowered by external fragmentation of the heap. Running the system for longer periods of time does not change that fact.

Fast memory allocation in O(1), but not completely deterministic. The first period after the system has started, pools of different memory block sizes are small, and requesting a memory block would sometimes be fulfilled by allocation from heap and sometimes from a ready block in a pool, and therefore not completely deterministic (but still O(1)). After a while, when (and if) the pools has grown to a size that can continue to fulfil the needs of the system, then memory blocks are always taken from the pools, and will therefore seam deterministic.

The solution does not have to search, and memory allocation is fast and handled in O(1).

Fast and deterministic memory deallocation in O(1).

The solution does not introduce non-determinism as a bad side effect on the use of memory given to the system as memory mapping (used by QNX and others) does.

1 byte of overhead per memory block regardless of block size is possible. Low internal fragmentation/waste are also possible. Waste is below 25% on average for the example algorithm, but could easily be reduced to below 1% by using an algorithm that has a less steep increase in block size. Narrowing the average different request sizes memory blocks can fulfil equals to more blocks in pools and may therefore in the end require equally as much heap. Need for more heap up front to ensure that the number of (especially) large memory blocks continue to be available is acceptable as this helps on 1) availability 2) testability (for RAM need) and 3) ensure that a sufficient RAM upgrade will continue to suffice at leas until new needs require more RAM.

This solution only use CPU and RAM when allocation and deallocation requests are handled, but it does not use CPU or RAM in between requests and therefore does not lower the possible utilization of the CPU (in between requests).

The solution provides an easier and more reliable way of testability for RAM need. As external fragmentation of heap has been eliminated, a specific set of needed memory blocks can not be unavailable caused by the system being running for longer period of time (changed fragmentation). Only if the system needs more memory blocks of a size than it has been used earlier and if the free heap (that is guaranteed to be contiguous) is not large enough for the new request, then the solution will not be able to fulfil the request. If the needed extra memory is installed in the system, the same situation is guaranteed not to happen again, and running the system for longer periods of time will still not change that fact (as fragmentation is eliminated).

This solution has some similarities with the static memory allocation as pools of different memory block sizes are created but at the same time avoids the bad properties of this approach: If a test fail or availability is too low then a sufficient RAM upgrade avoids the same situation to happen again. Even if the system has different RAM needs from time to time, then more RAM will reduce unavailability caused by insufficient RAM. This is without recompilation or reconfiguration as this solution automatically scales with the amount of RAM.

An embodiment of the invention automatically scales with the changes that are made to the software, as the size of the pools are built by the needs of the software when it executes. The developer does not have to use time for creation or maintenance of pools. The developer does not have to consideration the sizes of the pools when the software is changed.

The solution automatically scales to the different needs that are at the different installations, within the possibility of the, at any time available, RAM installed.

Provided that the system (heap manager) is restarted when the needed memory blocks fundamentally change, then the heap manager will adapt and scale to the different needs that may evolve over time at any installation. Normally this would only happen if the problem domain that the system supervises/controls also fundamentally change, and in such situations it is likely that the system is restarted anyway.

It is therefore a more efficient solution that is less error prone and less expensive compared to the static memory allocation approach.

An embodiment of the invention could be a one time implementation that could be used for many systems.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for managing physical memory of a data storage, the method comprising:
   requesting a memory portion having a memory portion size;
   identifying a pool from a plurality of pools, each of which being provided for storing at least one access information relating to a memory block having a particular memory size, wherein the identified pool is provided for storing plural instances of access information including a first access information and a second access information, where the first access information is indicative of an address of a first memory block of the data storage, the first memory block having a memory block size equal to or larger than the memory portion size, wherein the second access information is indicative of an address of a second memory block of the data storage, the second memory block having the memory block size, wherein the pool is configured such that at least one of the first access information and the second access information is accessible in a time span which is independent of the number of the plural instances of access information stored in the identified pool;

determining whether the first access information is stored in the identified pool;

wherein if the first access information is stored in the identified pool, then returning address data of the first memory block, wherein the address data is based on the first access information, and removing the first access information from the identified pool;

wherein if the first access information is not stored in the identified pool, then creating the first access information based on a start address of an available portion of the data storage, changing the start address of the available portion based on the memory block size, and returning address data of the memory block, wherein the address data is based on the first access information, wherein the creating the first access information further comprises writing a pool index relating to the identified pool into the physical memory of the data storage at an index portion of the data storage, wherein an address of the index portion is based on the first access information.

2. The method according to claim 1, further comprising: providing the first memory block so as to comprise a continuous physical memory section of the data storage, and such that the physical memory section has the memory block size, forming the memory block by physically consecutive memory cells.

3. The method according to claim 1, wherein the changing the start address of the available portion of the data storage is further based on a size of an extend memory block.

4. The method according to claim 3, further comprising: releasing the memory portion; and
storing the first access information in the identified pool.

5. The method according to claim 4, wherein releasing the memory portion is carried out by a requester having requested the memory portion.

6. The method according to claim 4, further comprising: determining the first access information based on the address of the first memory block,
wherein the storing the first access information in the identified pool is based on the pool index located in the index portion, wherein an address of the index portion is derivable from the first access information.

7. The method according to claim 3, further comprising, upon releasing the memory portion, maintaining the pool index relating to the pool in the physical memory of the data storage at the index portion of the data storage.

8. The method according to claim 3, wherein, in the data storage, the index portion is physically located adjacent to the first memory block.

9. The method according to claim 1, wherein the identifying the pool comprises determining the pool index based on the first access information.

10. The method according to claim 1, further comprising: requesting a further memory portion having a further memory portion size;
identifying a further pool, wherein the further pool is provided for storing at least one first further access information indicative of a further address of a first further memory block of the data storage, the first further memory block having a further memory block size which is equal to or larger than the further memory portion size and different from the memory block size;

determining whether the first further access information is stored in the further pool;

if the first further access information is stored in the further pool, then
returning further address data of the first further memory block, wherein the further address data are based on the first further access information and
removing the first further access information from the further pool;

if the first further access information is not stored in the further pool, then
creating the first further access information, and
returning further address data of the first further memory block, wherein the further address data are based on the first further access information.

11. The method according to claim 10, wherein a second further access information is stored in the further pool, wherein the second further access information is indicative of a further address of a second further memory block of the data storage, the second further memory block having the further memory block size.

12. The method according to claim 10, further comprising defining a data container, for storing plural pools, wherein the pool and the further pool are stored in the data container, wherein the data container is configured such that the pool and the further pool may be accessed within a time span which is constant for an increasing number of the plural pools stored in the container.

13. The method according to claim 12, wherein the data container is defined in the data storage.

14. The method according to claim 1, wherein the data storage is a heap.

15. A data storage management system, comprising:
a data storage for storing data; and
a controller for controlling an access to the data storage, wherein in operation:
the controller receives a request, the request requesting a memory portion having a memory portion size;
the controller identifies a pool from a plurality of pools, each of which being provided for storing at least one access information relating to a memory block having a particular memory size, wherein the pool is provided for storing plural instances of access information including a first access information and a second access information, wherein the first access information is indicative of an address of a first memory block of the data storage, the first memory block having a memory block size equal to or larger than the memory portion size, wherein the second access information is indicative of an address of a second memory block of the data storage, the second memory block having the memory block size, wherein the pool is configured such that at least one of the first access information and the second access information is accessible in a time span which is independent of the number of the plural instances of access information stored in the identified pool;

the controller determines whether the first access information is stored in the pool, such that;
- if the first access information is stored in the pool, then
  - the controller returns address data of the memory block, wherein the address data is based on the first access information, and
  - the controller removes the first access information from the pool;
- if the first access information is not stored in the pool, then
  - the controller creates the first access information based on a start address of an available portion of the data storage,
  - the controller changes the start address of the available portion based on the memory block size, and
  - the controller returns address data of the memory block, wherein the address data is based on the first access information,
  - wherein the controller writes a pool index relating to the identified pool into the physical memory of the data storage at an index portion of the data storage, wherein an address of the index portion is based on the first access information.

16. The method according to claim 8, wherein the index portion is physically located in a byte before or in a byte after the memory block.

* * * * *